(12) United States Patent
Ishiyama (10) Patent No.: US 6,186,682 B1
(45) Date of Patent: Feb. 13, 2001

(54) PRINTING SYSTEM THAT CAN PREDICT THE TIME IT WILL TAKE TO PRINT A DOCUMENT USING VARIOUS FORMATS AND PICK THE OPTIMUM PRINTING PATH

(75) Inventor: Masahiro Ishiyama, Yamagata (JP)

(73) Assignee: NEC Corporation, Tokyo (JP)

(*) Notice: Under 35 U.S.C. 154(b), the term of this patent shall be extended for 0 days.

(21) Appl. No.: 09/206,708

(22) Filed: Dec. 7, 1998

(30) Foreign Application Priority Data

Dec. 5, 1997 (JP) .................................................... 9-335942

(51) Int. Cl.[7] ...................................................... B41J 11/44
(52) U.S. Cl. .................................. 400/76; 400/70; 400/61
(58) Field of Search ............................... 400/76, 70, 61; 395/109, 114

(56) References Cited

FOREIGN PATENT DOCUMENTS

| 03220624 | * 9/1991 | (JP) . |
| 6-199000 | 7/1994 | (JP) . |
| 7-306760 | 11/1995 | (JP) . |
| 07322031 | * 12/1995 | (JP) . |

* cited by examiner

Primary Examiner—John S. Hilten
Assistant Examiner—Charles H. Nolan, Jr.
(74) Attorney, Agent, or Firm—Foley & Lardner

(57) ABSTRACT

A printing system comprises a printer in communication with a host computer through a bidirectional data transfer connection. A first processing time predicting section is capable of predicting first data processing time taken for the host computer to generate bit image data from print data. A second processing time predicting section is capable of predicting second data processing time taken for the printer to generate bit image data from print data. A transfer time predicting section is capable of predicting data transfer time taken for the data transfer connector to transfer data. A distribution controlling section determines distribution of data processing needed to generate bit image data from print data based on combination of the first and second data processing times predicted and the transfer time predicted to provide shortest time data processing distribution plan.

7 Claims, 8 Drawing Sheets

FIG. 1

HOST COMPUTER          PRINTER

FIG. 2

HOST COMPUTER          PRINTER

FIG. 6

PRINTING SYSTEM THAT CAN PREDICT THE TIME IT WILL TAKE TO PRINT A DOCUMENT USING VARIOUS FORMATS AND PICK THE OPTIMUM PRINTING PATH

FIELD OF THE INVENTION

The present invention relates to a printing system, and more particularly to a printing system wherein print data is transferred from a host computer to a printer for hardcopy printout.

BACKGROUND OF THE INVENTION

Printing systems are known in which print data is transferred from a printing apparatus control unit in the form of a host computer to a printing apparatus in the form of a printer for hardcopy printout. Some of them perform different procedure to handle image data from procedure to handle other type of data.

JP-A 7-306760 discloses a printing system in which a host computer analyzes print data and predicts transfer time required for data transfer if the data is transferred in a first format and predicts transfer time required for data transfer if the data is transferred in a second format. The host computer compares the predicted transfer times with each other and selects one of the first and second formats for data transfer in response to the comparison result for shortening the overall time required for printing the data.

JP-A 6-199000 discloses a printing system including a host computer and a plurality of printers in communication with the host computer. The host computer stores a table containing information as to fonts stored in each of the printers. The host computer analyzes print data and looks into the table and predicts data quantities for data transfer to all of printers. The host computer selects one of the printers, which needs the least data quantity for data transfer thereto, and then initiates transfer of the print data to the selected printer.

A host computer can handle different types of print data, such as character data, drawing data and bit image data. The host computer and a printer share data processing to convert these data into a synthesized bit image data for hardcopy printout. Different types of print data demand different times and data processing for conversion into bit image data. Print data is different in data quantity from bit image data resulting from conversion thereof.

Throughput of a host computer determines time required for processing data. Different computers have different throughputs, respectively. Thus, they need different lengths of time in processing the same data. Throughput of a printer determines time required for processing data. Different printers have different throughputs, respectively, thus requiring different lengths of time in processing the same data. Time required for data transfer between a host computer and a printer depends on throughput of the host computer, throughput of the printer and throughput of an interface between the host computer and the printer.

Printing systems are not yet known which conduct optimum distribution of data processing between a host computer and a printer after consideration of throughputs of the system components to provide shortest time data processing for translating print data to bit image data for hardcopy printout.

SUMMARY OF THE INVENTION

An object of the present invention is to provide a printing system that determines optimum distribution of data processing to a host computer and a printer to provide shortest time data processing for translating print data into bit image for hardcopy printout.

According to the present invention, there is provided a printing system comprising:

a printing apparatus controller including a first bit image generator capable of generating bit image data from print data;

a printing apparatus including a second bit image generator capable of generating bit image data from print data;

a first processing time predicting section capable of predicting first data processing time taken for the first bit image generator to generate bit image data from print data;

a second processing time predicting section capable of predicting second data processing time taken for the second bit image generator to generate bit image data from print data;

a data transfer connector transfer interconnecting the printing apparatus controller and the printing apparatus;

a transfer time predicting section capable of predicting first data transfer time taken for the data transfer connector to transfer data from the printing apparatus controller to the printing apparatus; and a distribution controlling section that determines distribution of data processing needed to generate bit image data from print data based on combination of the first and second data processing times predicted and the transfer time predicted to provide shortest time data processing distribution plan for printing print data.

DESCRIPTION OF THE PREFERRED EMBODIMENTS

Figure 1:
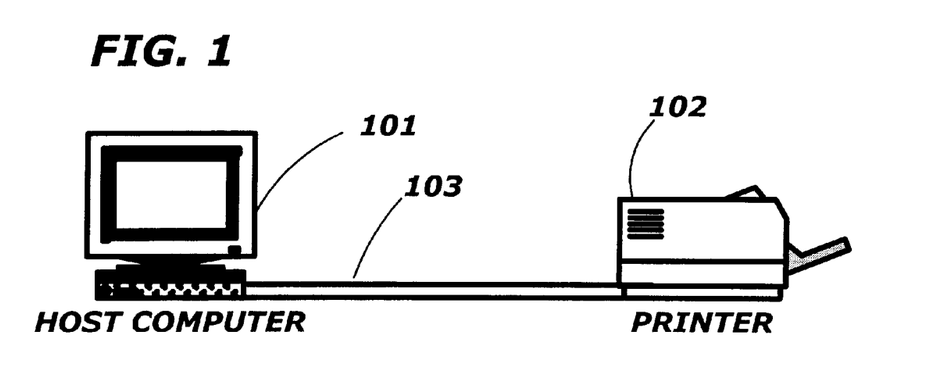
FIG. 1 illustrates hardware of a printing system incorporating the present invention.

Referring now to the drawings, and more particularly to FIG. 1, a printing system implementing the invention is illustrated. The printing system as illustrated comprises a printing apparatus controller in the form of a host computer 101 and a printing apparatus in the form of a printer 102. An interface, preferably in the form of a bi-directional interface 103, interconnects the host computer 101 and the printer 102.

The printing system is not limited to the illustrated independent system. The present invention may be implemented by a networked system having at least one host computer and multiple printers. In this case, a host computer and a printer on the network implement the invention when the host computer and the printer on the network are put into bidirectional interfaced relationship.

Figure 2:
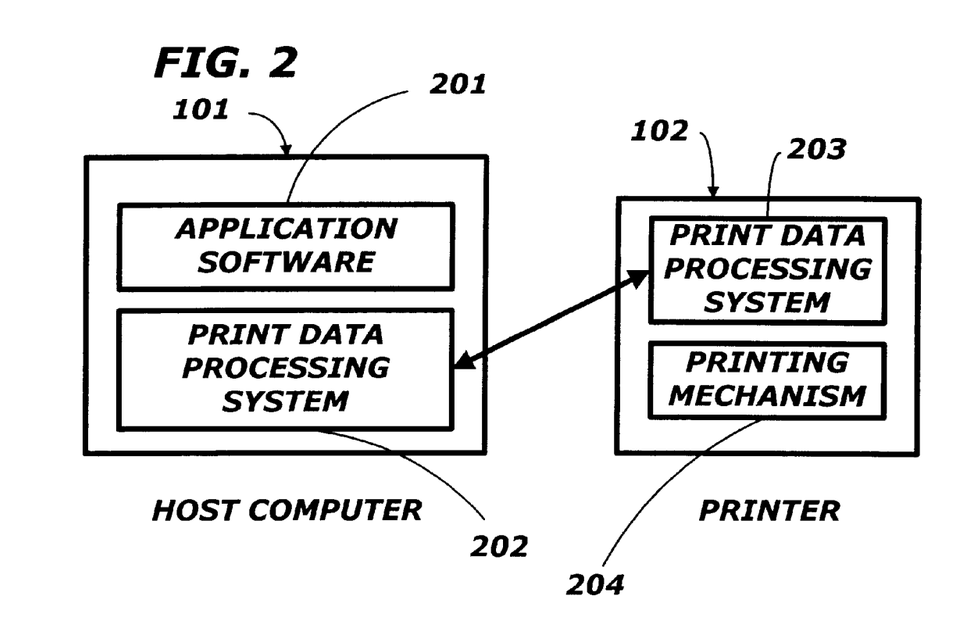
FIG. 2 is a block diagram of a host computer and a printer of the printing system.

Referring to FIG. 2, the host computer 101 has a host computer print data processing (HCPDP) system 202 and the printer 102 has a printer print data processing (PPDP) system 203. As the discussion develops, it will be understood that the HCPDP system 202 includes a module serving as a bit image generator that is capable of generating bit image data from print data or segment thereof distributed to the host computer 101. The PPDP system 203 also includes a module serving as a bit image generator that is capable of generating bit image data from print data or the other segment thereof that is distributed to the printer 102.

The HCPDP system 202 determines distribution of data processing needed to establish bit image data at the printer 102 corresponding to print data to provide the shortest time distributive data processing plan for printing the print data. For this determination, the HCPDP system 202 inputs information regarding throughputs of the host computer 101, the printer 102 and the interface 103. Throughput of the host computer 101 is expressed in terms of three different data processing standard (DPS) times required for the host computer 101 to generate three bit image data corresponding to character type standard data, drawing type standard data and bit image type standard data, respectively. The three standard data of different types have predetermined data quantities, respectively. Similarly, throughput of the printer 102 is expressed in terms of three different DPS times required for the printer 102 to generate three bit image data corresponding to the three standard data of different types, respectively. Throughput of the interface 103 is expressed in terms of data transfer standard (DTS) time required for the interface 103 to transfer standard data from the host computer 101 to the printer 102. Print data may consist of a first portion of character type data, a second portion of drawing type data and a third or the other portion of bit image type data. The HCPDP system 202 inputs information regarding data type and quantity of each portion of the print data. The HCPDP system 202 predicts total printing time in accordance with each of possible data processing distribution plans based on the DPS times and the DTS time and the content of the print data. The HCPDP system 202 selects one distribution plan that has the shortest total printing time.

In the host computer 101, application software 201 produces print data. The print data is used as an input to the HCPDP system 202.

The HCPDP system 202 predicts total printing time in accordance with each of possible data processing distribution plans based on the DPS times and the DTS time and the content of the print data. The HCPDP system 202 selects one distribution plan that has the shortest total printing time.

Assume that the selected distribution plan distributes a portion of the print data to the home computer 101 and the other portion of the print data to the printer 102. The HCPDP system 202 generates bit image data from the portion of the print data and transfers the bit image data to the printer 102.

The HCPDP system 202 does not translate the other portion of the print data and transfers it to the printer 102. The PPDP system 203 generates bit image data from the other portion of the print data.

The HCPDP system 202 synthesizes the bit image data generated by the application software system 201 with the bit image data generated by the PPDP system 203 to provide synthesized bit image. The printer 102 includes a printing mechanism 204. The printing mechanism 204 prints the synthesized bit image data.

Figure 3:
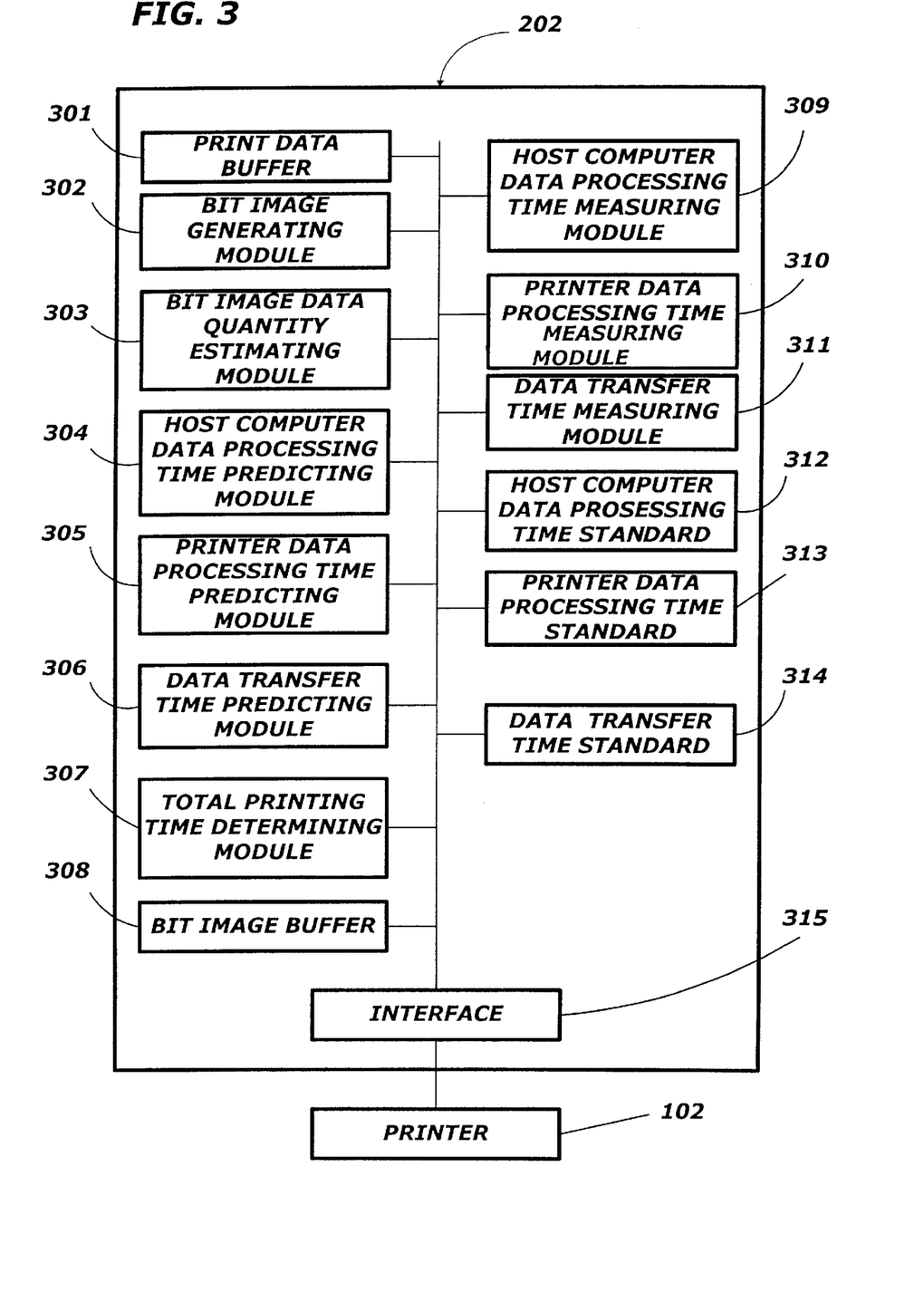
FIG. 3 is a block diagram illustrating a print data processing system of the host computer.

The HCPDP system 202 may preferably include software modules. FIG. 3 illustrates configuration of the HCPDP system 202 in connection with the printer represented by a box 102. Referring to FIG. 3, the HCPDP system 202 has a print data buffer 301 that stores print data from the application software 201. A bit image data generating module 302 functions to generate bit image data from the portion of the print data distributed thereto. A bit image data quantity-predicting module 303 predicts data quantity of the bit image data generated by the bit image data generating module 302. The predicted data quantity at the module 303 is used in predicting data transfer time. A host computer processing time predicting module 304 predicts data processing times for the host computer 101 to translate portions the print data into bit image data adjusted to resolution of the printer 102, respectively. A printer processing time predicting module 305 predicts data processing times for the printer 102 to translate portions of the print data into bit image data adjusted resolution of the printer 102, respectively. A data transfer time predicting module 306 predicts transfer time taken for the interface 103 to transfer the data quantity predicted by the module 303 from the host computer 101 to the printer 102. A total printing time determining module 307 determines the most efficient distribution plan to distribute bit image data generating jobs between the host computer 101 and the printer 102 to provide the shortest printing time. A bit image buffer 308 stores the bit image data generated by the bit image data modulating module 302. A host computer processing time measuring module 309 measures processing time taken for the host computer 101 to generate bit image data from standard print data. A printer processing time measuring module 310 measures processing time taken for the printer 102 to generate bit image data from standard print data. A data transfer time measuring module 311 measures transfer time taken for the interface 103 to transfer standard print data from the host computer 101 to the printer 102. A box 312 stores the processing time resulting from measurement by the module 309 as a host computer data processing time (HCDPT) standard. A box 313 stores the processing time resulting from measurement by the module 310 as a printer data processing time (PDPT) standard. A box 314 stores the transfer time resulting from measurement by the module 311 as a data transfer time (DTT) standard. A box 315 represents an interface for communication with the printer 102.

Figure 4:
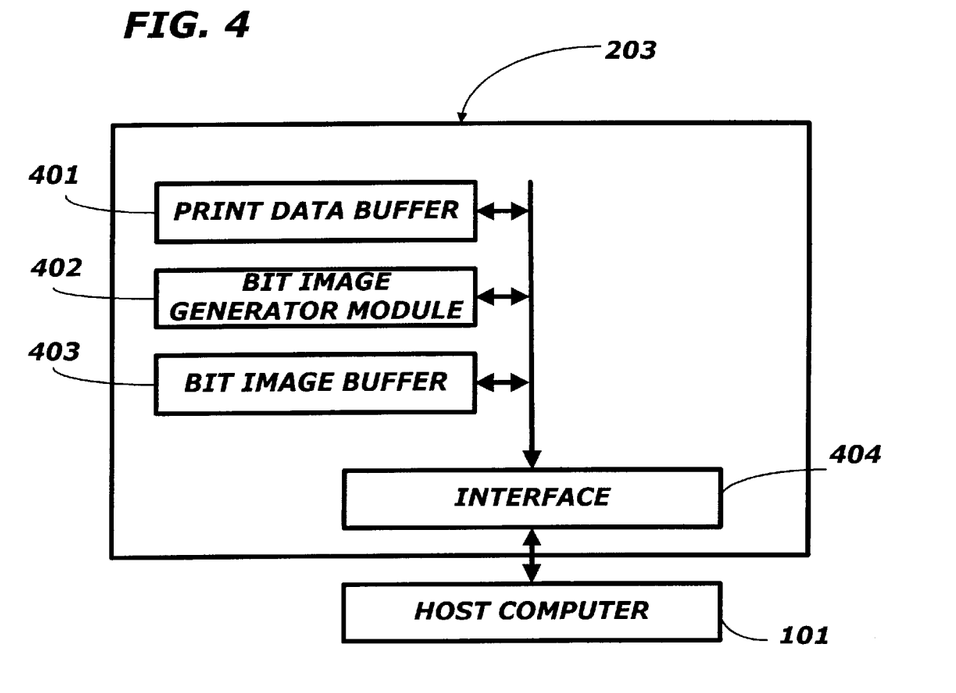
FIG. 4 is a block digram illustrating a print data processing system of the printer.

FIG. 4 illustrates configuration of the PPDP system 203. Referring to FIG. 4, the PPDP system 203 has a print data buffer 401 that stores print data from the HCPDP system 202. A bit image data generating module 402 functions to generate bit image data from the print data stored in the print data buffer 401. A bit image buffer 403 stores the bit image data generated by the bit image data generating module 402. A box 404 represents an interface for communication with the host computer 101.

In this embodiment, the modules 303, 304, 305, 306, 307, 309, 310 and 311 are distinct units of software of the HCPDP system 202, and the module 402 is a unit of software of the PPDP system 203. These modules are not limited to software and may be in the form of processing circuits, respectively.

Figure 5:
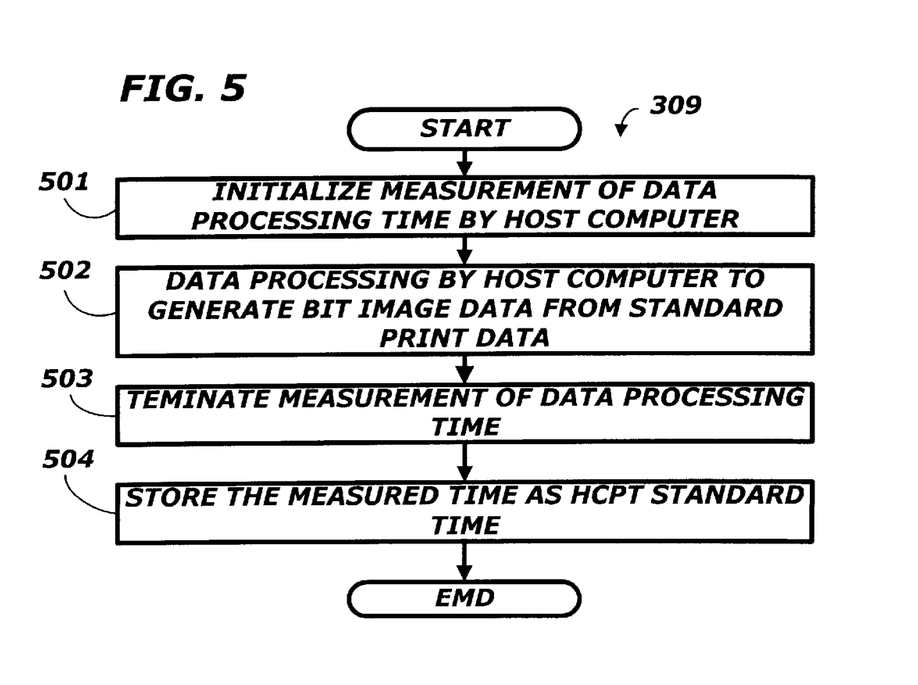
FIG. 5 is a flow diagram of a control routine of a host computer data processing time measuring module shown in FIG. 3.

FIG. 5 is a flow diagram of a control routine of the host computer data processing time measuring module 309. In step 501, the routine initializes measurement of data processing time by the host computer 101. In step 502, the host computer 101 generates bit image data from standard print data. In step 503, the routine terminates measurement of data processing time upon completion of the bit image data generation. In step 504, the routine stores the measured time as the HCPT standard at the box 312.

Figure 6:
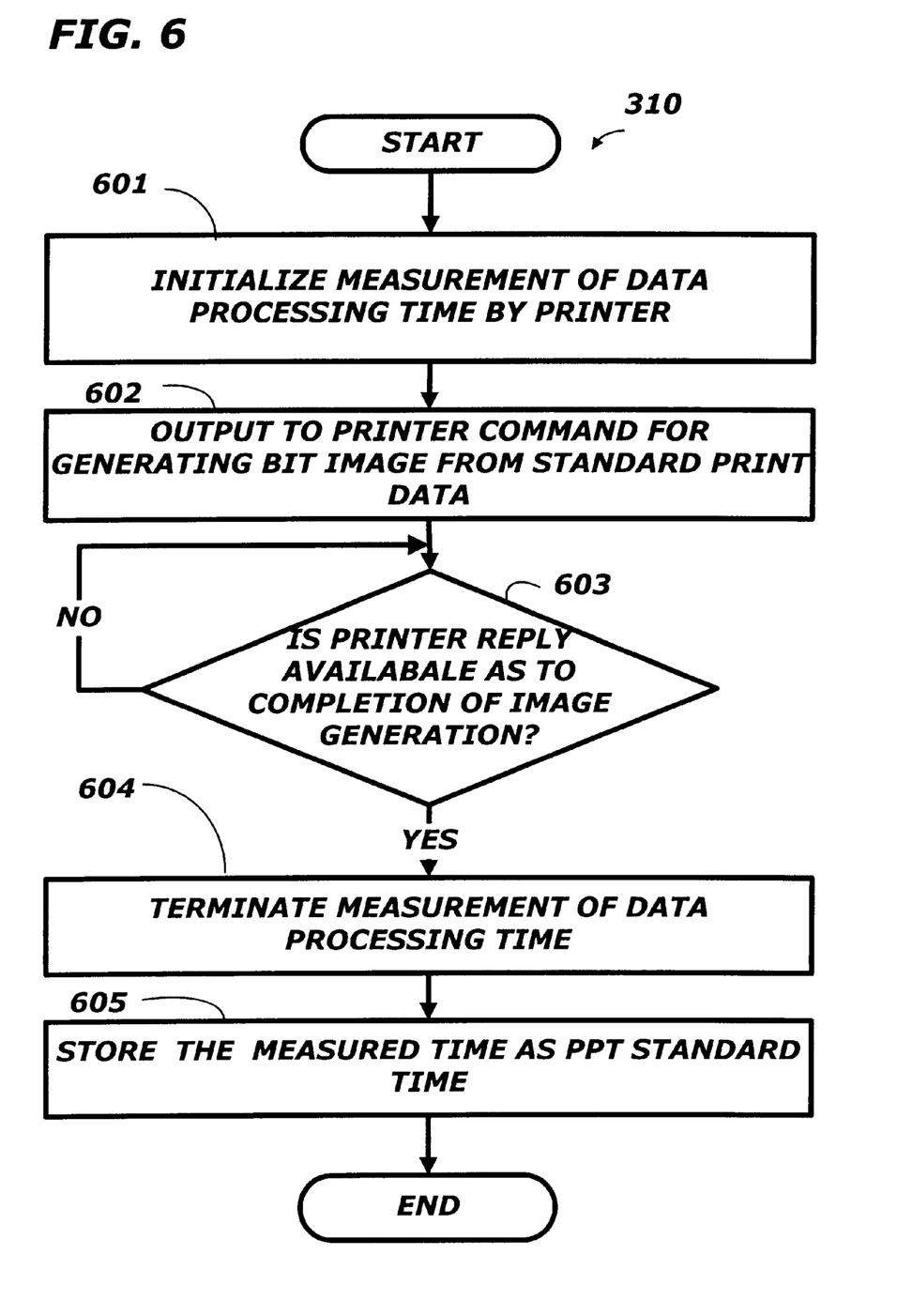
FIG. 6 is a flow diagram of a control routine of a printer data processing time measuring module shown in FIG. 3.

FIG. 6 is a flow diagram of a control routine of the printer processing measuring module 310. In step 601, the routine initializes measurement of data processing time by the printer 102. In step 602, the routine outputs to the printer 102 a command for generating bit image data from standard print data. The printer 102 generates bit image data from the standard print data. In step 603, the routine determines whether or not there is available the printer's reply of completion of processing. If the reply is available, the routine proceeds from step 603 to step 604. In step 604, the routine terminates measurement of data processing time upon completion of the bit image data generation by the printer 102. In step 605, the routine stores the measured time as the PPT standard at the box 313.

In the flow diagram of FIG. 6, the host computer 101 measures the processing time by the printer 102. If desired, the printer 102 may carry out the measurement of the processing time and inform the host computer 101 of the result of this measurement trough the bi-directional interface.

Figure 7:
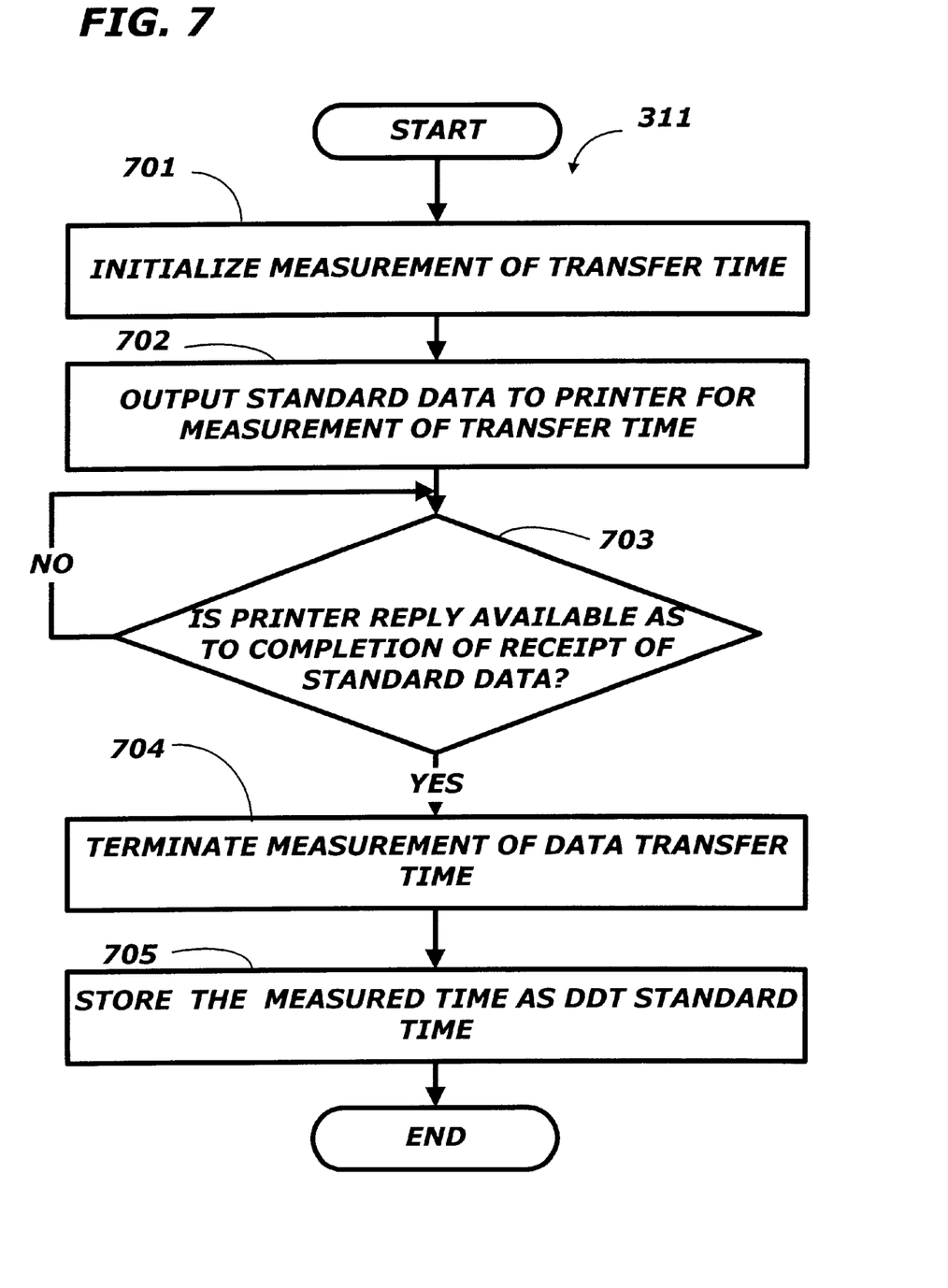
FIG. 7 is a flow diagram of a control routine of a data transfer time measuring module shown in FIG. 3.

FIG. 7 is a flow diagram of a control routine of the data transfer measuring module 311. In step 701, the routine initializes measurement of data transfer time from the host computer 101 to the printer 102. In step 702, the routine outputs standard data to the printer 102 for measurement of transfer time. In step 703, the routine determines whether or not there is available printer's reply of completion of receipt of data. If the reply is available, the routine proceeds from step 703 to step 704. In step 704, the routine terminates measurement of data transfer time upon completion of receipt of data by the printer 102. In step 705, the routine stores the measured transfer time as the DTT standard at the box 314.

In the flow diagram of FIG. 7, the host computer 101 measures the transfer time. If desired, the printer 102 may carry out the measurement of the transfer time and inform the host computer 101 of the result of this measurement trough the bi-directional interface.

The standard print data is prepared for each of character type data, drawing type data and bit image type data and measured to determine the HCPT time standard, PPT standard and DTT standard. Use of these standards increases accuracy of prediction at each of the modules 304, 305 and 306.

Figure 8:
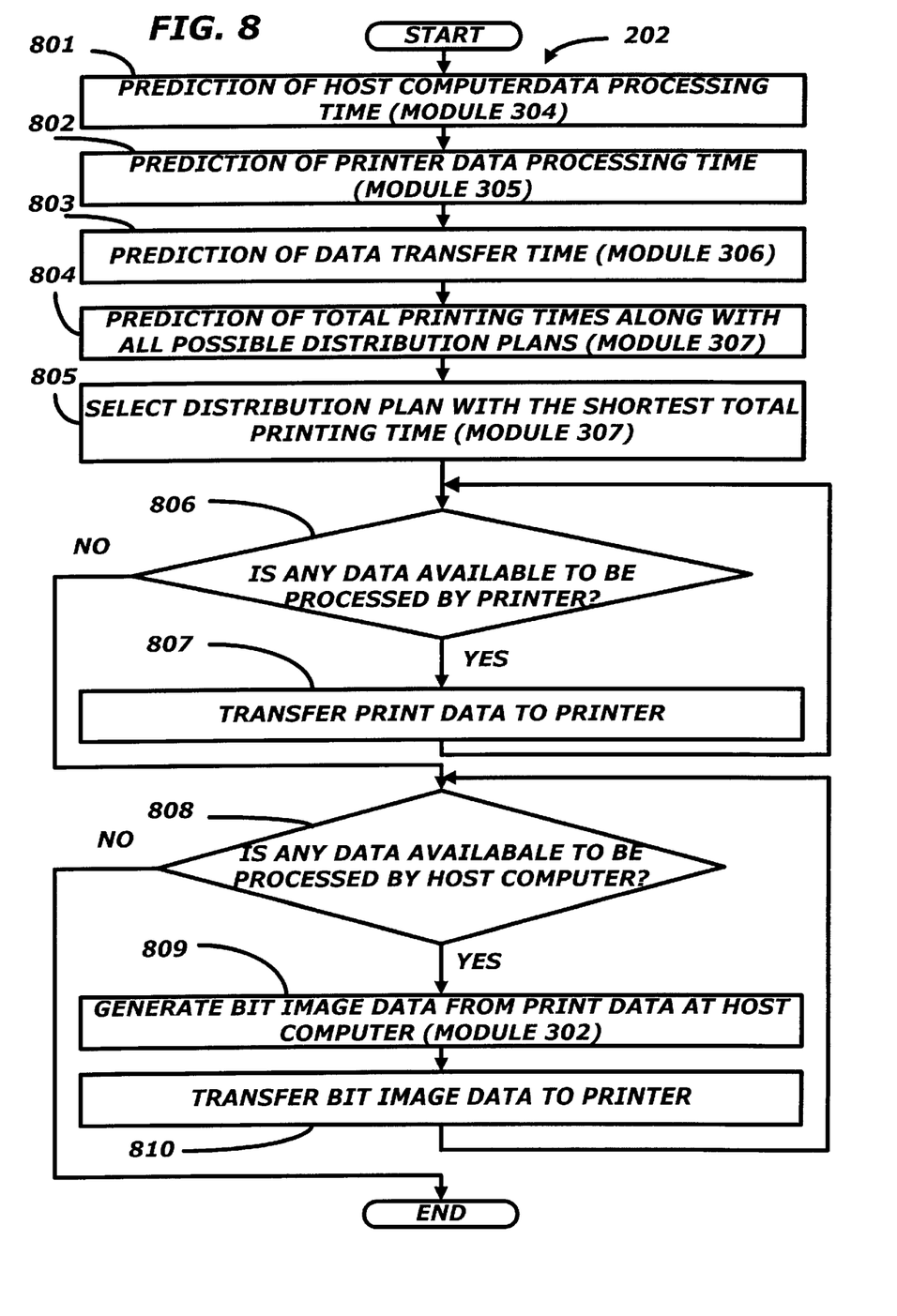
FIG. 8 is a flow diagram of a printing control routine of a total printing time determining module shown in FIG. 3.

FIG. 8 is a flow diagram of a printing control routine in the host computer 101. The host computer 101 executes this control routine. In step 801, print data received from the application software 201 is stored in the print data buffer 301 and the module 304 predicts host computer data processing times based on content of the stored print data and the HCPT standard stored at the box 312. In step 802, the module 305 predicts printer data processing times based on content of the stored print data and the PPT standard stored at the box 313. In step 803, the module 303 predicts data quantity after generation of bit image from the print data based on content of the stored print data, and the module 306 predicts data transfer time based on the predicted data quantity and the DTT standard stored at the box 314.

In step 804, the module 307 predicts total printing times for possible print data distribution plans, respectively. In step 805, the module 307 selects one distribution plan that has the shortest total printing time and determines distribution of the stored print data between the host computer 101 and the printer 102 in accordance with the selected distribution plan.

Print data to be processed by the printer 102 is transferred to the printer 102 (steps 806 and 807). Print data to be processed by the host computer 101 is processed at the module 302 into bit image data and stored at the bit image buffer 308 (steps 808 and 809). The bit image data stored at the buffer 308 is transferred to the printer 102 (step 810).

Figure 9:
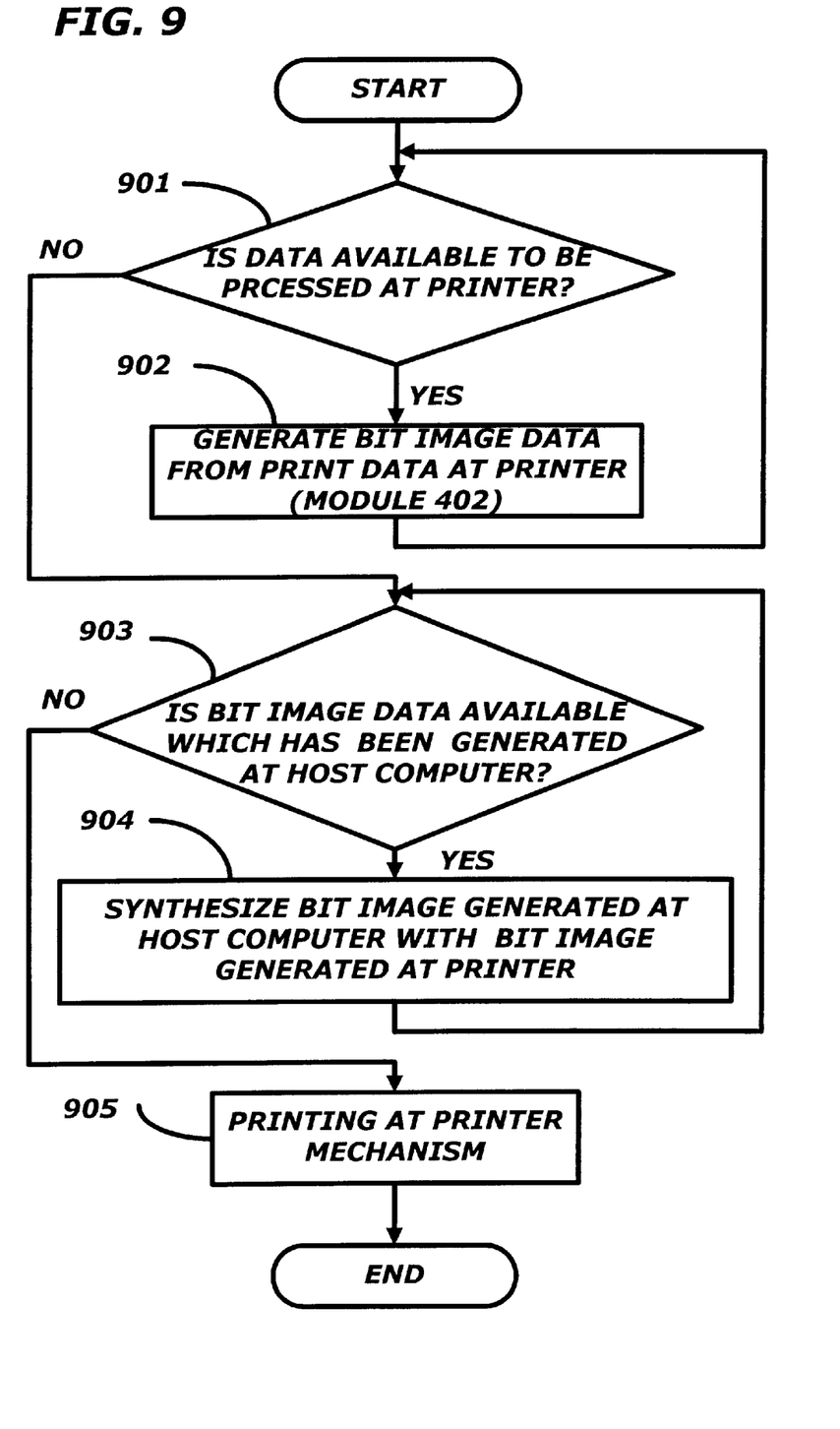
FIG. 9 is a flow diagram of a printing control routine of the printer print data processing system shown in FIG. 2.

FIG. 9 is a flow diagram of a printing control routine in the printer 102. The printer 102 executes this control routine. The print data that has been transferred from the host computer 101 is stored at the print data buffer 401. The module 402 generates bit image data from this stored print data and stores the bit image data at the bit image buffer 403 (steps 901 and 902). The bit image data from the host computer 101 and the bit image data generated by the printer are synthesized with each other (see steps 903 and 904). The synthesized bit image data is printed at printer mechanism (step 905).

Figure 10:
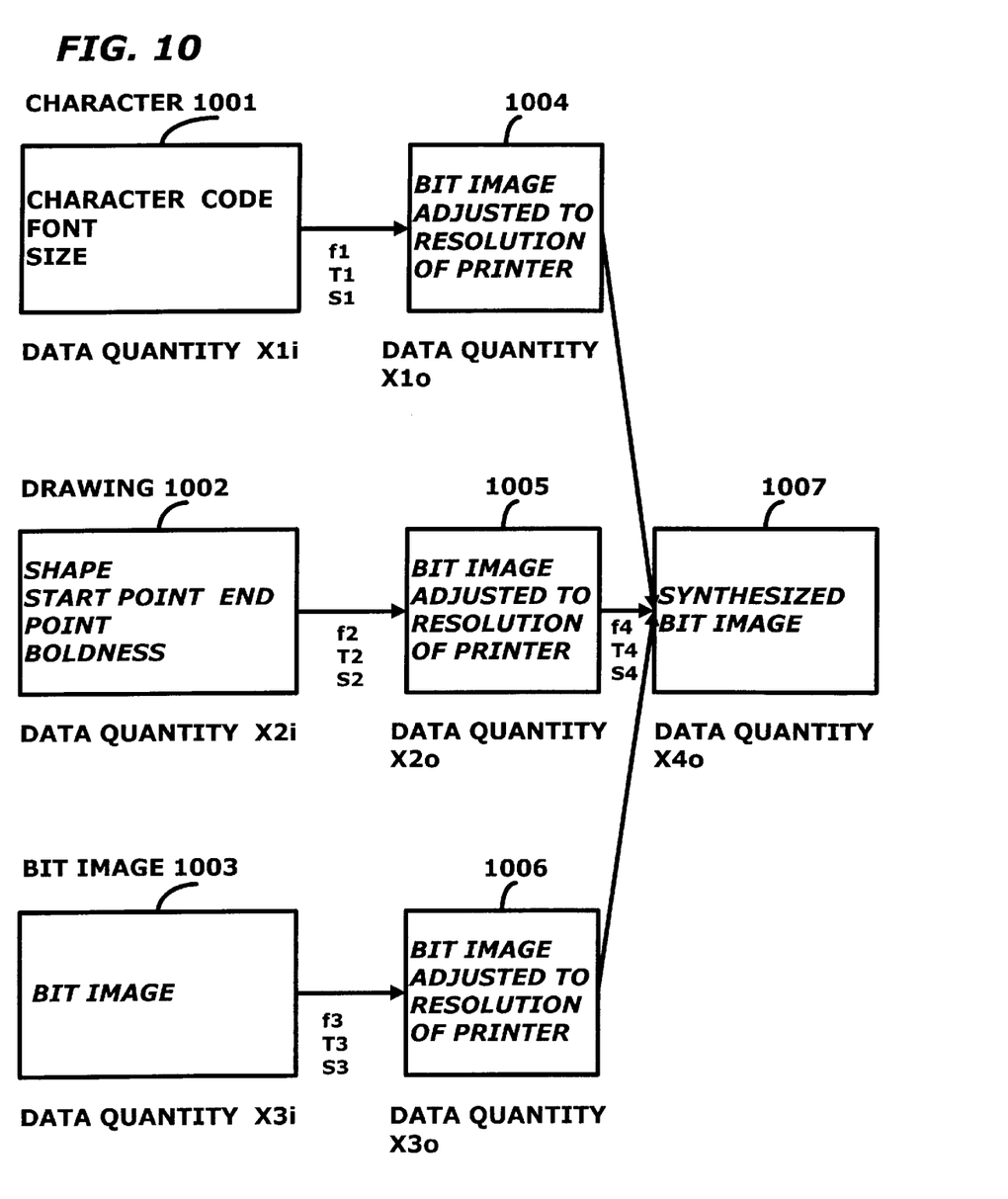
FIG. 10 illustrates a data processing flow to generate synthesized bit image from the data.

FIG. 10 illustrates processing flow of print data to synthesized bit image ready for hardcopy printout. Character 1001, drawing 1002 and bit image 1003 are available. These print data are subject to the corresponding plural data processing f1, f2 and f3 to form bit images 1004, 1005 and 1006, respectively. These bit images 1004, 1005 and 1006 are adjusted to the resolution of the printer 102 and synthesized (data processing f4) with each other to form synthesized bit image 1007.

In FIG. 10, X1i is the data quantity of the character 1001 and X1o is the data quantity of the bit image 1004. X2I is data quantity of the drawing 1002 and X2o is data quantity of the bit image 1005. X3I is data quantity of the bit image 1003 and X3o is data quantity of the bit image 1006. X4o is data quantity of the synthesized bit image 1007.

In FIG. 10, T1 is the first host computer throughput in generating bit image from character type print data, which is expressed in terms of the HCPT standard time taken to generate bit image from character type standard print data. T2 is the second host computer throughput in generating bit image from drawing type print data, which is expressed in terms of HCPT standard time taken to generate bit image from drawing type standard print data. T3 is the third host computer throughput in generating bit image from bit image type print data, which is expressed in terms of HCPT standard time taken to generate bit image from bit image type standard print data. T4 is the fourth host computer throughput in synthesizing bit images with each other, which is expressed in terms of HCPT standard time taken to synthesize bit image standard data with each other.

In FIG. 10, S1 is the first printer throughput in generating bit image from character type print data, which is expressed in terms of PPT standard time taken to generate bit image from character type standard print data. S2 is the second printer throughput in generating bit image from drawing type print data, which is expressed in terms of PPT standard time taken to generate bit image from drawing type standard print data. S3 is the third-printer throughput in generating bit image from bit image type print data, which is expressed in terms of PPT standard time taken to generate bit image from bit image type standard print data. S4 is the fourth printer throughput in synthesizing bit images with each other, which is expressed in terms of PPT standard time taken to synthesize bit image standard data with each other.

There are nine (9) possible distribution plans, namely plans #1, #2, #3, #4, #5, #6, #7, #8 and #9, which are tabulated as in the following Table I.

TABLE I

|     | HOST COMPUTER  | PRINTER        |
| --- | -------------- | -------------- |
| #1  | nil            | f1, f2, f3, f4 |
| #2  | f1             | f2, f3, f4     |
| #3  | f2             | f1, f3, f4     |
| #4  | f3             | f1, f2, f4     |
| #5  | f1, f2         | f3, f4         |
| #6  | f1, f3         | f2, f4         |
| #7  | f2, f3         | f1, f4         |
| #8  | f1, f2, f3     | f4             |
| #9  | f1, f2, f3, f4 | nil            |

Let us now assume that print data constitutes a first portion a in the form of character type data, a second portion b in the form of drawing type data, and a third or the other portion c in the form of bit image type data. The reference character U represents throughput of data transfer form the host computer 101 to the printer 102. The throughput U is expressed in terms of DTT standard time taken to transfer standard data form the host computer 101 to the printer 102. In this case, total printing times for all possible distribution plans as in Table I are expressed as in the following Table II.

TABLE II

| #1 | $(a*X1i+b*X2i+c*X3i)*U+a*X1i*S1+b*X2i*S2+c*X3i*S3+(a*X1o+b*X2o+c*X3o)*S4$ |
| #2 | $a*X1i*T1+(a*X1o+b*X2i+c*X3i)*U+b*X2i*S2+c*X3i*S3+(a*X1o+b*X2o+c*X3o)*S4$ |
| #3 | $b*X2i*T2+(a*X1i+b*X2o+c*X3i)*U+a*X1i*S1+c*X3i*S3+(a*X1o-b*X2o+c*X3o)*S4$ |
| #4 | $c*X3i*T3+(a*X1i+b*X2i+c*X3o)*U+a*X1i*S1+b*X2i*S2+(a*X1o+b*X2o+c*X3o)*S4$ |
| #5 | $a*X1i*T1+b*X2i*T2+(a*X1o+b*X2o+c*X3i)*U+c*X3i*S3+(a*X1o+b*X2o+c*X3o)*S4$ |
| #6 | $a*X1i*T1+c*X3i*T3+(a*X1o+b*X2i+c*X3o)*U+b*X2i*S2+(a*X1o+b*X2o+c*X3o)*S4$ |
| #7 | $b*X2i*T2+c*X3i*T3+(a*X1i+b*X2o+c*X3o)*U+a*X1i*S1+(a*X1o+b*X2o+c*X3o)*S4$ |
| #8 | $a*X1i*T1+b*X2i*T2+c*X3i*T3+(a*X1o+b*X2o+c*X3o)*U+(a*X1o+b*X2o+c*X3o)*S4$ |
| #9 | $a*X1i*T1+b*X2i*T2+c*X3i*T3+(a*X1o+b*X2o+c*X3o)*T4+X4o*U$ |

Selecting one distribution plan that provides the shortest total printing time will provide printing at the fastest speed.

In the preceding description, the printing system includes a printing apparatus in the form of a printer and a printing apparatus controller in the form of a host computer. The printing apparatus controller is not limited to a host computer and may be in the form of other data host data processing unit.

Although the present invention has been described in accordance with the embodiments shown, on of ordinary skill in the art will readily recognize that there could be variations to the embodiments and those variations would be within the spirit and scope of the present invention. Accordingly, many modifications may be made by one of ordinary in the art without departing from the spirit and scope of the appended claims.

What is claimed is:

1. A printing system comprising:
   a printing apparatus controller including a first bit image generator for generating bit image data from print data;
   a printing apparatus including a second bit image generator for generating bit image data from print data;
   a first processing time predicting section for predicting first data processing time taken for the first bit image generator to generate bit image data from print data;
   a second processing time predicting section for predicting second data processing time taken for the second bit image generator to generate bit image data from print data;
   a data transfer connector interconnecting the printing apparatus controller and the printing apparatus;
   a transfer time predicting section for predicting first data transfer time taken for the data transfer connector to transfer data from the printing apparatus controller to the printing apparatus; and
   a distribution controlling section that determines distribution of data processing needed to generate bit image data from print data based on a combination of the first and second data processing times predicted and the transfer time predicted to provide a shortest time data processing distribution plan for printing print data.

2. The printing system as claimed in claim 1, including:
   a first data processing time measuring section to measure a third data processing time taken for the printing apparatus controller to generate bit image data from standard print data for setting the measured third data processing time as a first standard time; and
   a second data processing time measuring section to measure a fourth data processing time taken for the printing apparatus to generate bit image data from standard print data for setting the measured second data processing time as a second standard time.

3. The printing system as claimed in claim 2, including:
   a data transfer time measuring section to measure second data transfer time taken for the data transfer connector to transfer standard data from the printing apparatus controller to the printing apparatus for setting the measured transfer time as a third standard time.

4. The printing system as claimed in claim 3, wherein the printing apparatus controller is in the form of a host computer, and the printing apparatus is in the form of a printer.

5. The printing system as claimed in claim 4, including:
   a bit image data quantity predicting module to predict data quantity of a bit image data after being generated from print data and to provide the predicted data quantity; and
   wherein the first processing time predicting section includes a host computer processing time predicting module to predict the first data processing time taken for the host computer to generate bit image data from print data based on a content of the print data and the first standard time; and
   wherein the second processing time predicting section includes a printer processing time predicting module to predict the second data processing time taken for the printer to generate bit image data from print data based on a content of the print data and the second standard time;
   wherein the data transfer time predicting section includes a data transfer time predicting module to predict the first data transfer time based on the predicted data quantity and the third standard time; and wherein the distribution controlling section includes a total printing time determining module to determine the distribution of data processing to generate bit image data from print data based on the predicted first and second processing times and the predicted transfer time.

6. The printing system as claimed in claim 5, wherein the total printing time determining module predicts total printing time taken for generating synthesized bit image ready for hardcopy printout from print data including character type data, drawing type data and bit image type data along with each of a plurality of distribution plans and selects one distribution plan having the shortest total printing time for generation of synthesized bit image data from the print data.

7. A printing control method for a printing system including a printing apparatus controller including a first bit image generator for generating bit image data from print data, a printing apparatus including a second bit image generator for generating bit image data from print data, and a data transfer connector interconnecting the printing apparatus controller and the printing apparatus, the printing control method comprising the steps of:

predicting a first data processing time taken for the fist bit image generator to generate bit image data from print data;

predicting a second data processing time taken for the second bit image generator to generate bit image data from print data;

predicting a data transfer time taken for the data transfer connector to transfer data from the printing apparatus controller to the printing apparatus;

determining a distribution of data processing needed to generate bit image data from print data based on a combination of the first and second data processing times predicted and the data transfer time predicted to provide a shortest time data processing distribution plan for printing print data; and generating synthesized bit image data from the print data along with the shortest time data processing distribution plan.

* * * * *